(No Model.)
P. BRAILLY.
CARRIAGE BRAKE.
No. 487,512. Patented Dec. 6, 1892.
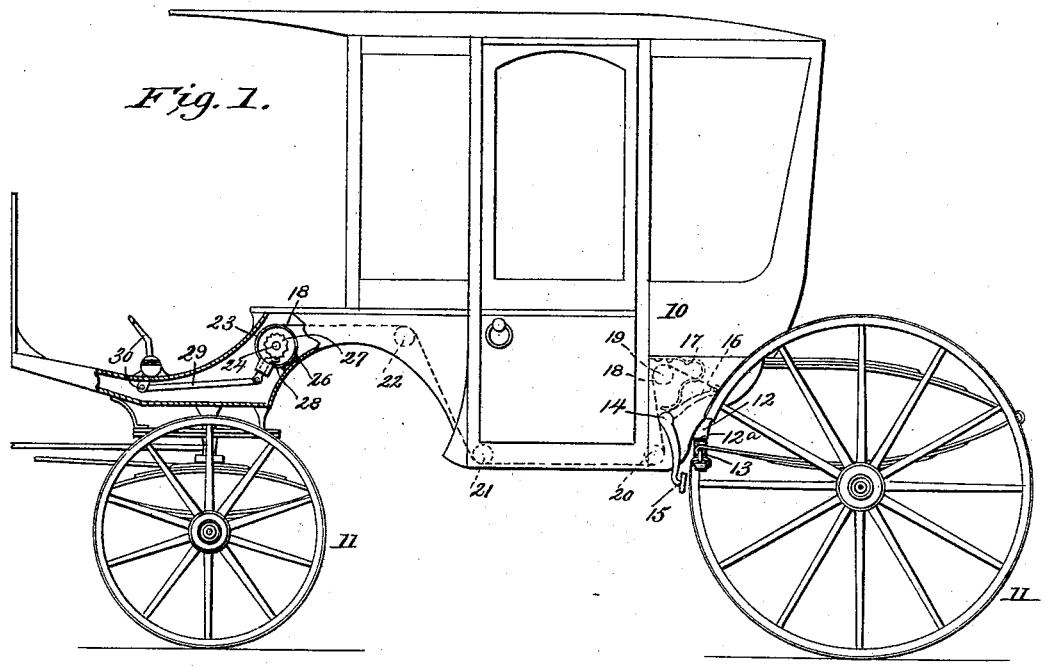
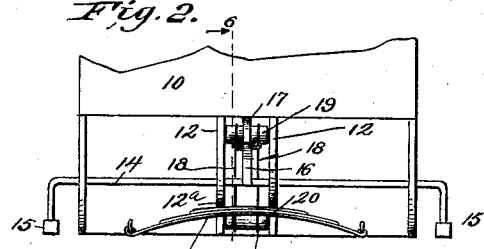
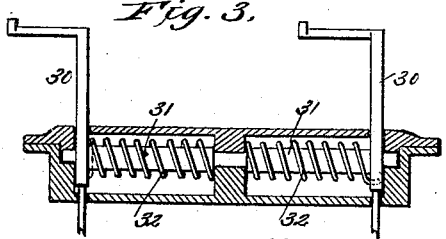
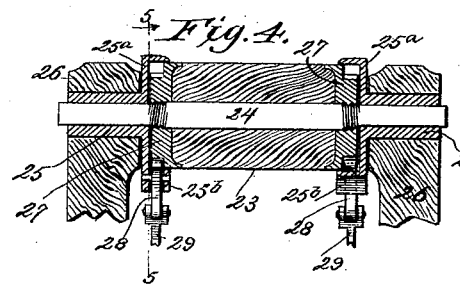
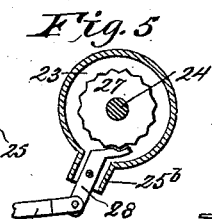
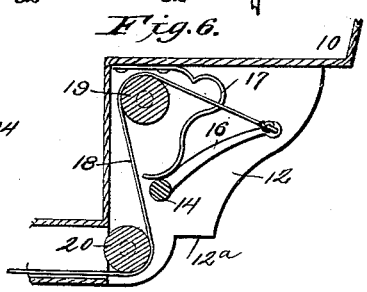
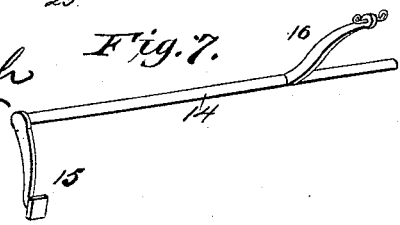
WITNESSES:
Fred G. Dieterich
M. D. Blondel
INVENTOR:
Philippe Brailly.
BY Munn & Co.
ATTORNEYS

UNITED STATES PATENT OFFICE.

PHILIPPE BRAILLY, OF BELLAIRE, OHIO.

CARRIAGE-BRAKE.

SPECIFICATION forming part of Letters Patent No. 487,512, dated December 6, 1892.

Application filed April 2, 1892. Serial No. 427,552. (No model.)

*To all whom it may concern:*

Be it known that I, PHILIPPE BRAILLY, of Bellaire, in the county of Belmont and State of Ohio, have invented a new and useful Improvement in Carriage-Brakes, of which the following is a specification.

This invention relates generally to carriage-brakes, and is particularly adapted for closed carriages, such as rockaways, coupés, and the like.

The object of my invention is to provide a brake that can be quickly and conveniently applied by foot-power and one in which all the operative mechanism is concealed from view and the action of the elements.

A further object of my invention is to provide certain improved constructions whereby the connection of the body with rear springs is simplified; and a still further object of my invention is to provide certain automatic mechanisms for returning the several parts to their normal positions after the brake has been released.

With these objects in view my invention consists in the peculiar construction and arrangement of the various parts, such as shown in the drawings, set forth in the description, and pointed out in the claims.

In the drawings forming a part of this specification, Figure 1 is a side view of carriage provided with my improved brake, parts being broken away to expose the operating mechanism. Fig. 2 shows the rear end of carriage with brake and spring attached thereto. Fig. 3 is a detail view of the pedal and rock-shaft attached thereto. Fig. 4 is a longitudinal section of the winding-drum. Fig. 5 is transverse section on the line 5 5 of Fig. 4. Fig. 6 is a section on line 6 6 of Fig. 2, and Fig. 7 is a detail view of the brake-beam and attached arm.

Referring to the drawings, 10 indicates the body of a carriage, and 11 the wheels supporting the same. Vertical bearing-blocks 12 12 are secured beneath the rear end of the carriage-body, said blocks having shoulders 12ᵃ 12ᵃ, which rest upon the transverse springs 13, and thus support the rear end of the carriage and dispense with the longitudinal irons now in common use for connecting the springs and rear portion of the carriage-body. The transverse brake-beam 14 is journaled in the bearing-blocks 12 and carries the brake-shoes 15 at its ends, which shoes are adapted to be brought into contact with the rear wheels.

A rearwardly-projecting arm 16 is attached to the brake-beam 14 between the bearing-blocks 12, and bearing upon said arm intermediate its ends is a spring 17, secured to the bottom of carriage and which serves to hold the arm 16 down and the shoes out of contact with the wheels. An operating rope or cable 18 is attached to the free end of the arm 16, said rope being passed forward over roller 19, journaled between the blocks 12 near their upper ends under the roller 20, journaled between the lower ends of the blocks, and the roller 21, arranged in the bottom of the carriage over roller 22 and wound upon a drum 23, journaled within the body near the forward end of the same. The rope 18 is preferably double, as shown, and the carriage-body is constructed with a double bottom and the rollers arranged between the same; but this is not absolutely essential, as the rollers could be arrrnged upon the bottom of the vehicle and the ropes and rollers protected by means of a casing or covering secured to the bottom. By winding the rope upon the drum 23 the arm 16 is drawn up, compressing spring 17 and applying the shoes to the rear wheels. In order to wind the rope 18 upon the drum 23, I mount said drum upon a shaft 24, said shaft turning in the bearings 25, which in turn are journaled in the blocks 26. The inner ends of the bearings 25 are formed with flanges 25ᵃ, having depending lugs 25ᵇ, and between the ends of drum 23 and the bearings 25 ratchet-wheels 27 are mounted upon the shaft 24, and engaging said ratchet-wheels are the pawls or dogs 28, pivoted to the depending lugs 25ᵇ, the lower ends of said pawls being connected with the pitman-rods 29, which are connnected with the foot-levers 30, said foot-levers being secured upon a rock-shaft 31, journaled upon the foot-board of the carriage, said shaft having a spiral spring 32 connected therewith to hold the foot-levers in their normal positions, as clearly shown in Figs. 1 and 3. It will thus be seen that by pressing upon either lever 30 the pawl or dog will be thrown into engagement with the ratchet-wheels, the shaft 24 revolved, and consequently the drum 23. The rope 18, being attached to the drum 23, is wound thereon as it revolves, thus drawing up the arm 16 upon the beam and applying the brake. The moment the pressure is released from the foot-lever the spring-actuated shaft will operate to release the pawl, and the spring 17, bearing on the arm 16, will operate to release the brake and unwind the rope from the drum. By these means all the operative parts are returned to their normal position, ready for operation.

Having thus described my invention, what I claim as new, and desire to secure by Letters Patent, is—

1. In a carriage-brake, the combination, with the body, of the brake-beam, the operating-rope and guide-pulleys, the winding-drum, the foot-levers, pitmen, and intermittent gripping devices between the pitmen and winding-drum, substantially as shown and described.

2. In a carriage-brake, the combination, with the body, of the vertical bearing-blocks, the transverse spring upon which the blocks rest, and the brake-beam journaled in said blocks, substantially as shown and described.

3. The combination, with the body, of the brake-beam journaled thereto, the arm connected thereto, the spring-bearing thereon, the operating-ropes and guide-pulleys, and the winding-drum upon which the operating-rope is wound, substantially as shown and described.

4. The combination, with the body, of the brake-beam journaled thereto and carrying an arm, the spring, the operating-rope, the winding-drum, the ratchet-wheels connected therewith, the pawls engaging said ratchet-wheels, the pitman-rods, and operating foot-levers, all arranged substantially as shown and described.

5. The combination, with the winding-drum, of the ratchet-wheels, the pawls engaging said ratchet-wheels, the pitman-rods, the foot-levers, and spring-actuated shaft upon which said levers are fulcrumed, substantially as shown and described.

6. The combination, with the winding-drum, of the shaft upon which it is mounted, the bearings in which the shaft turns, having flanges, the journal-blocks, the ratchet-wheels mounted on the shaft, the pawls pivoted to the flanges, and the pitman-rods, all arranged substantially as shown and described.

7. The combination, with the winding-drum, of the shaft upon which it is mounted, the bearings in which the shaft turns, having flanges, the journal-blocks in which the bearings turn, the ratchet-wheels mounted on the shaft, the pawls pivoted to the flanges, the pitman-rods connected to the pawls, the foot-levers connected with the pitmen, and the spring-actuated shaft to which the levers are attached, substantially as shown and described.

PHILIPPE BRAILLY.

Witnesses:
WM. N. BRAILLY,
CHAS. E. ROEDER.